(12) United States Patent
Skaw

(10) Patent No.: US 9,464,451 B1
(45) Date of Patent: Oct. 11, 2016

(54) HOLDING TANKS, SYSTEMS AND METHODS

(71) Applicant: Jack Skaw, New Auburn, WI (US)

(72) Inventor: Jack Skaw, New Auburn, WI (US)

( * ) Notice: Subject to any disclaimer, the term of this patent is extended or adjusted under 35 U.S.C. 154(b) by 0 days.

(21) Appl. No.: 14/839,330

(22) Filed: Aug. 28, 2015

(51) Int. Cl.
| | |
|---|---|
| *B65D 88/76* | (2006.01) |
| *E04H 7/00* | (2006.01) |
| *B65D 88/02* | (2006.01) |
| *B65D 43/14* | (2006.01) |
| *E04B 1/16* | (2006.01) |
| *B28B 1/14* | (2006.01) |
| *B28B 23/00* | (2006.01) |

(52) U.S. Cl.
CPC . *E04H 7/00* (2013.01); *B28B 1/14* (2013.01); *B28B 23/0043* (2013.01); *B65D 43/14* (2013.01); *B65D 88/02* (2013.01); *E04B 1/164* (2013.01); *E04B 2103/02* (2013.01)

(58) Field of Classification Search
CPC ..... B28B 1/14; B28B 23/0043; B65D 88/02; E04B 1/164; E04B 2103/02; E04H 7/00
USPC ........ 52/19, 20, 21, 79.1, 79.11, 79.14, 192, 52/197
See application file for complete search history.

(56) References Cited

U.S. PATENT DOCUMENTS

| | | | | |
|---|---|---|---|---|
| 2,858,695 A | | 11/1958 | Loughborough | |
| 3,263,378 A | * | 8/1966 | Dorris | H02G 9/10 174/37 |
| 3,438,157 A | * | 4/1969 | Monica | E02D 29/12 52/124.2 |
| 3,521,537 A | * | 7/1970 | Forni | H02G 9/10 404/25 |
| 3,731,448 A | * | 5/1973 | Leo | H02G 9/10 138/112 |
| 4,715,966 A | * | 12/1987 | Bowman | C02F 3/006 210/532.2 |
| 4,826,644 A | * | 5/1989 | Lindquist | B28B 7/22 264/256 |
| 4,931,235 A | * | 6/1990 | Lindquist | B28B 19/0038 249/1 |
| 4,961,293 A | * | 10/1990 | House | B65D 88/76 52/169.6 |
| 5,037,239 A | * | 8/1991 | Olsen | B09B 1/00 405/129.5 |
| 5,090,713 A | * | 2/1992 | Johnson | E02D 29/14 277/648 |
| 5,157,888 A | * | 10/1992 | Lindquist | B28B 7/22 264/71 |
| 5,248,219 A | | 9/1993 | Heiler, Jr. | |
| 5,320,247 A | | 6/1994 | Sharp | |

(Continued)

*Primary Examiner* — James Buckle, Jr.
(74) *Attorney, Agent, or Firm* — Anthony J. Bourget

(57) ABSTRACT

A concrete holding tank and related systems and methods, including a monolithic concrete sewage holding tank created with two separate pours of concrete where an encased-in-place seal (water stop) is positioned at a pour joint between a tub of the tank and a cover of the tank, and where in some aspects the second pour also forms a structural column contacting a bottom of the tank and supporting the cover. The structural column and resulting larger cover presents a tank having a low profile while still providing desired capacity.

26 Claims, 17 Drawing Sheets

(56) References Cited

U.S. PATENT DOCUMENTS

| | | | |
|---|---|---|---|
| 5,384,049 A * | 1/1995 | Murphy | B01D 17/0208 210/519 |
| 5,454,544 A | 10/1995 | Del Zotto | |
| 5,495,695 A * | 3/1996 | Elliott, Jr. | B65D 88/76 220/565 |
| 5,746,030 A * | 5/1998 | Sannipoli, Sr. | E04H 13/00 52/136 |
| 5,778,608 A * | 7/1998 | Elliott, Jr. | B65D 88/76 220/565 |
| 5,800,143 A * | 9/1998 | Bravo | B67D 7/78 141/86 |
| 5,865,346 A * | 2/1999 | Del Zotto | B60S 5/02 137/234.6 |
| 5,881,760 A * | 3/1999 | Del Zotto | B65D 88/76 137/264 |
| 6,047,724 A * | 4/2000 | Nurse, Jr. | F16L 5/02 137/236.1 |
| 6,196,761 B1 * | 3/2001 | Stanton | B60S 5/02 137/312 |
| 6,340,269 B1 * | 1/2002 | Stanton | B60S 5/02 137/312 |
| 6,598,242 B1 | 7/2003 | Denome | |
| 6,637,976 B2 * | 10/2003 | Stanton | B60S 5/02 220/567.2 |
| 6,649,060 B2 | 11/2003 | Perry | |
| 7,144,506 B2 | 12/2006 | Lombardi, II | |
| 7,437,855 B2 | 10/2008 | Locke | |
| 8,070,005 B1 | 12/2011 | Kruger | |
| 8,307,604 B2 * | 11/2012 | Stepanian | H02G 9/10 52/169.1 |
| 8,863,445 B2 * | 10/2014 | Zhong | E04B 1/165 52/79.14 |
| 2003/0121216 A1 * | 7/2003 | Nale | E02D 29/12 52/19 |
| 2008/0041782 A1 | 2/2008 | Pattee | |

* cited by examiner

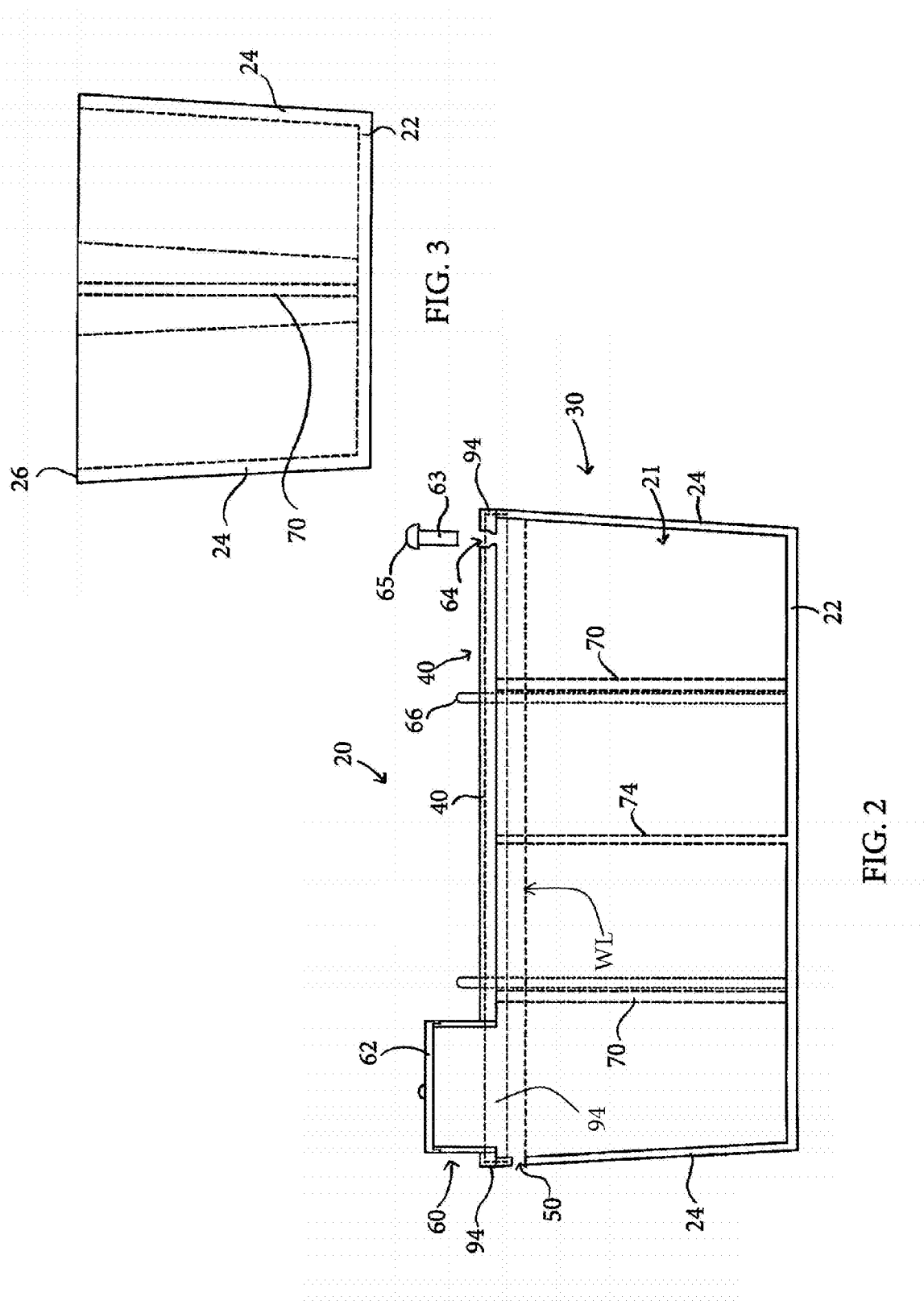

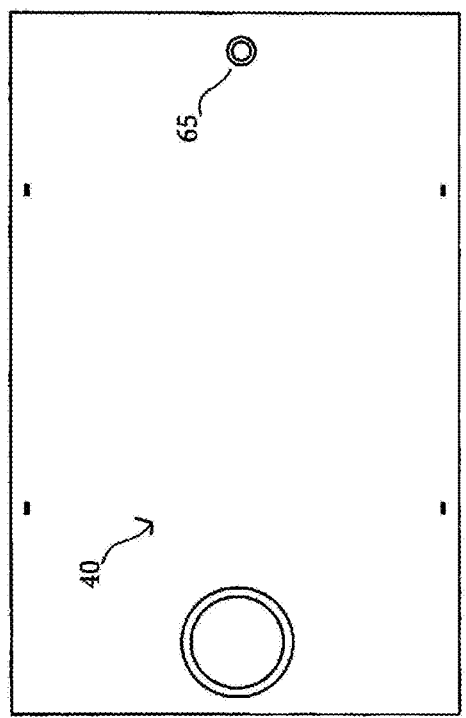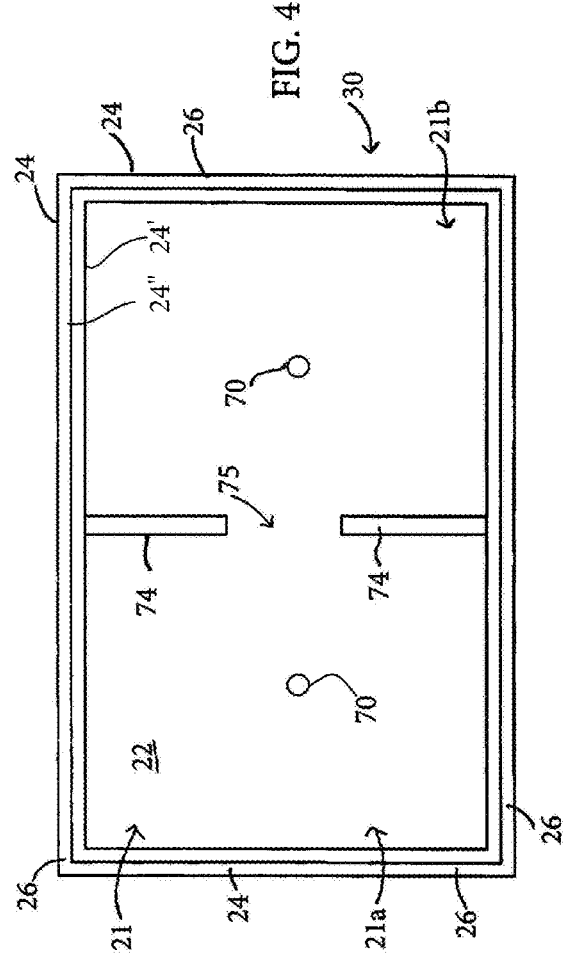

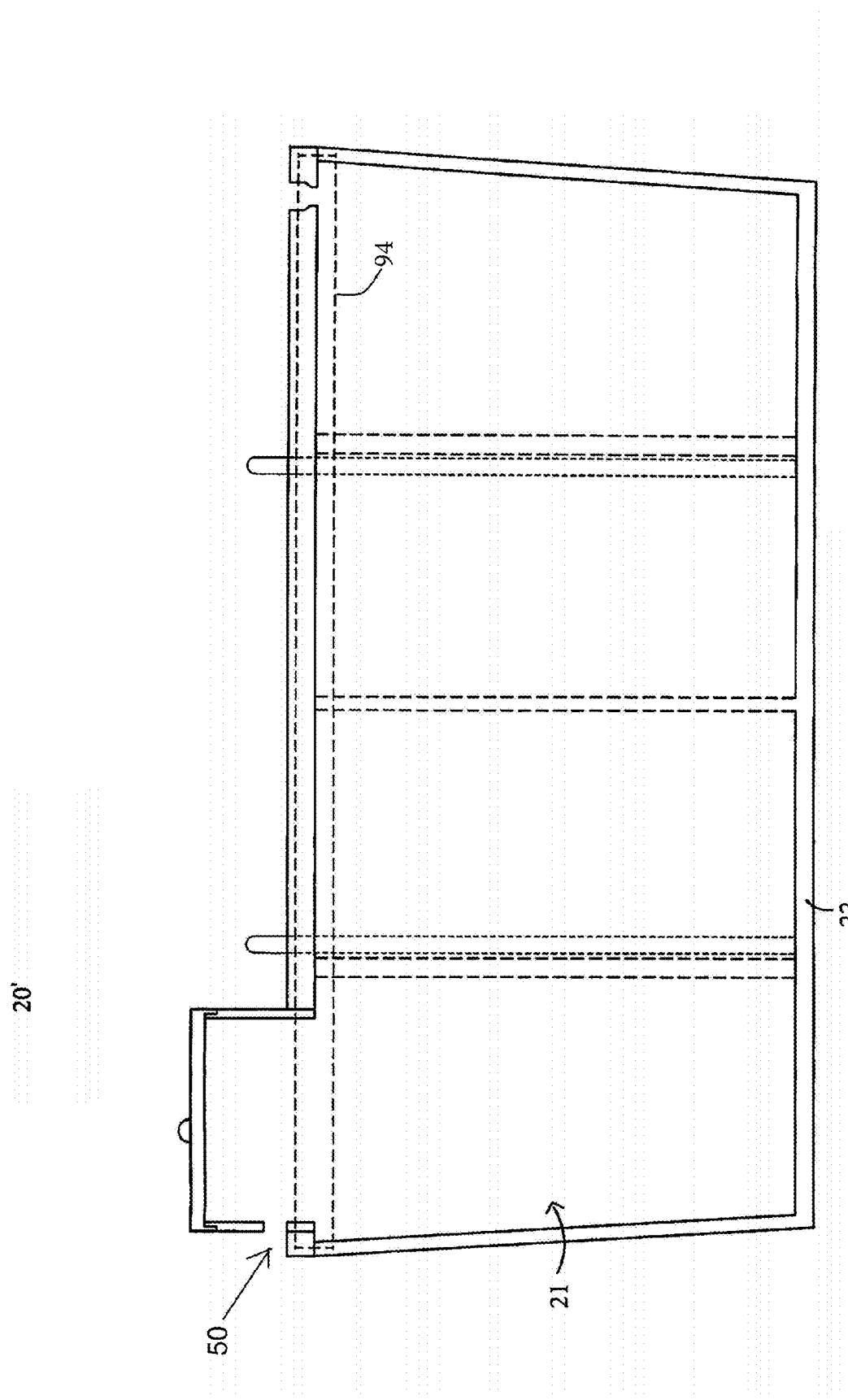

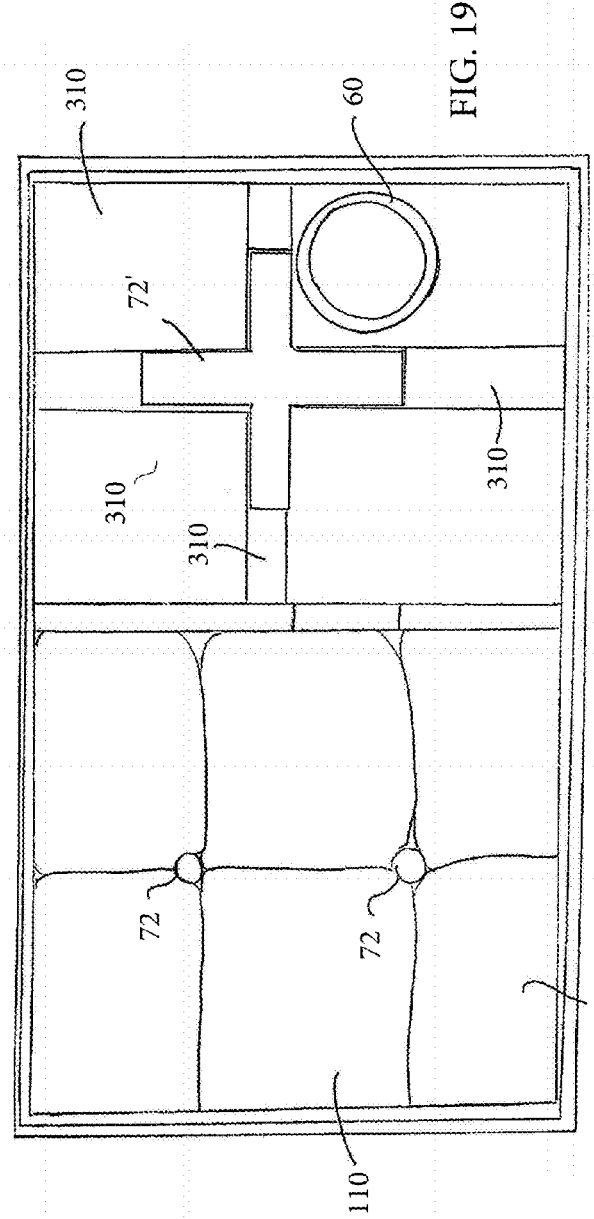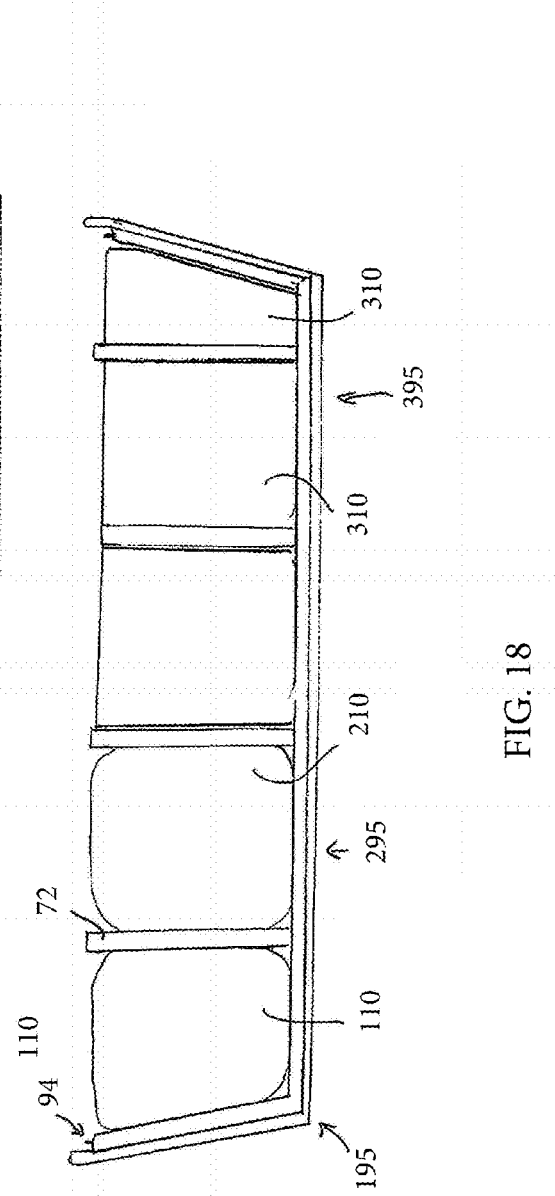
FIG. 18
FIG. 19

HOLDING TANKS, SYSTEMS AND METHODS

BACKGROUND OF THE INVENTION

1. Field of the Invention

The present invention relates to holding tanks and more particularly to precast concrete holding tanks with an inlet for receiving materials into the tank, together with associated tank systems and methods of manufacture of tanks and tank systems.

2. Background Information

Holding tanks are commonly used in sewage holding and/or septic systems. Typically a sewage holding tank includes an inlet to receive the sewage and a manhole positioned at the top of the tank for access into the tank. A hose is usually connected to or placed within the tank to remove the sewage by pumping. Many holding tanks are made with concrete and are configured to hold several thousands of gallons. In some jurisdictions a 2000 gallon capacity tank is utilized or is the minimum capacity required. To achieve sufficient volume a typical tank will have a general dimension of 12 feet long by 8 feet wide by 5 feet tall. The tank will typically be buried in the ground and often a few feet of dirt or soil will cover the tank. The tank must be structurally sound to hold such large volumes of sewage while also being strong enough to support a covering of dirt or soil and to withstand breaking or cracking while also avoiding leaks. A typical tank also includes a pre-cast concrete cover which is placed on top of a pre-cast concrete box-like structure. A sealant such as liquid tar or other sealant is placed on the top of the walls of the box-like structure and the cover is then placed on the sealant. A problem occurs if the sealant releases or is compromised, such as in harsh conditions of freeze/thaw, where sewage may escape the tank or liquids may infiltrate the tank. Sewage escaping the tank may cause sanitary and environmental problems. Liquids seeping into the tank also cause the tank to fill prematurely, resulting in additional cost of having to frequently pump the full tank These and other problems demonstrate there is room for improvement of holding tanks.

SUMMARY OF THE INVENTION

Applicant has recognized that present holding tanks may leak. Particularly, a leak may form at the joint between the cover and the remainder of the tank. Typically tar is used to secure and to attempt to seal the cover to the top of the tank wall. Applicant has developed a tank having a seal and cover which are less apt to leak. The seal is encased in place (i.e., is an encased-in-place seal) between the side walls of the tub of the tank and the cover of the tank. The encased-in-place seal encircles the perimeter top face of the tank and is completely encased by a poured-in-place cover in conjunction with a poured-in-place tub. The seal is suspended so that it may be completely encased in concrete which will provide a water stop to enhance the function and lifespan of such tanks.

Applicant has also developed a unique precast concrete holding tank which may be used as a sewage holding and/or septic tank or tank for other purposes. The precast tank includes a tub having a bottom and four upstanding walls where the walls define a perimeter top face of the tub. The tank includes a poured-in-place cover which covers the tub and overlays the perimeter top face. In additional aspects, the poured-in-place cover may include reinforced steel and the cover may also be integrally connected to at least one concrete brace which extends from a bottom surface of the tank to the cover. In additional aspects the poured-in-place cover encases a seal about the perimeter of the tank. The precast tank is transported to a location for use with a sewage system, for instance. Further aspects include delivering and installing the precast concrete tank.

Applicant has also recognized that present holding tanks have a tall profile. For instance, many common tanks have a floor to cover height of 60 inches or more. Applicant has developed a tank having a relatively high storage capacity while also enjoying a relatively low input port. Aspects of the invention include use of a brace or braces within the tank to assist in support of the cover. Such additional support allows for the cover to increase in size so that the overall dimensions of the tank can be adjusted (and the height lessened) while still maintaining a desired storage capacity. In one aspect the brace or braces include a poured in place column of concrete. The column may be formed with the same pour of concrete as is used for pouring the cover. The cover is poured in place. In one aspect the column may be integrally connected to the cover. In one aspect a deck is positioned in a tub of the tank. Cement is poured on the deck to form the cover and to also encase or at least partially encase a seal associated with the tank. The cement pour also may form the brace or concrete column integrally connected to the cover. In further aspects the invention includes a form system used to fabricate the tank.

In further method aspects of the invention the tank is manufactured as a complete unit with two separate pours where the cover is poured in place on top of a previously poured tub. In one aspect a seal is encased within the tub at a perimeter tip face of the tub and extends upward therefrom. The entire unit is delivered on-site for placement, and avoids having to connect a cover to the rest of a tank in the field.

The above partial summary of the present invention is not intended to describe each illustrated embodiment, aspect, or every implementation of the present invention. The figures and detailed description and claims that follow more particularly exemplify these and other embodiments and further aspects of the invention.

BRIEF DESCRIPTION OF THE DRAWINGS

The invention may be more completely understood in consideration of the following description of various embodiments of the invention in connection with the accompanying drawings, in which:

FIG. 2 is a cross section view taken along line 2-2 of FIG. 1.

FIG. 3 is a section view according to one aspect of the present invention.

FIG. 4 is a top view of a component of the holding tank of FIG. 2.

FIG. 5 is a top view of a component of the holding tank of FIG. 2.

FIG. 6 is a cross section view of a further aspect of the invention.

FIG. 18 is a cross section of a component of the present invention in accordance with a further aspect of the present invention.

FIG. 19 is a top view of a component of the present invention in accordance with a further aspect of the present invention.

Figure 1:
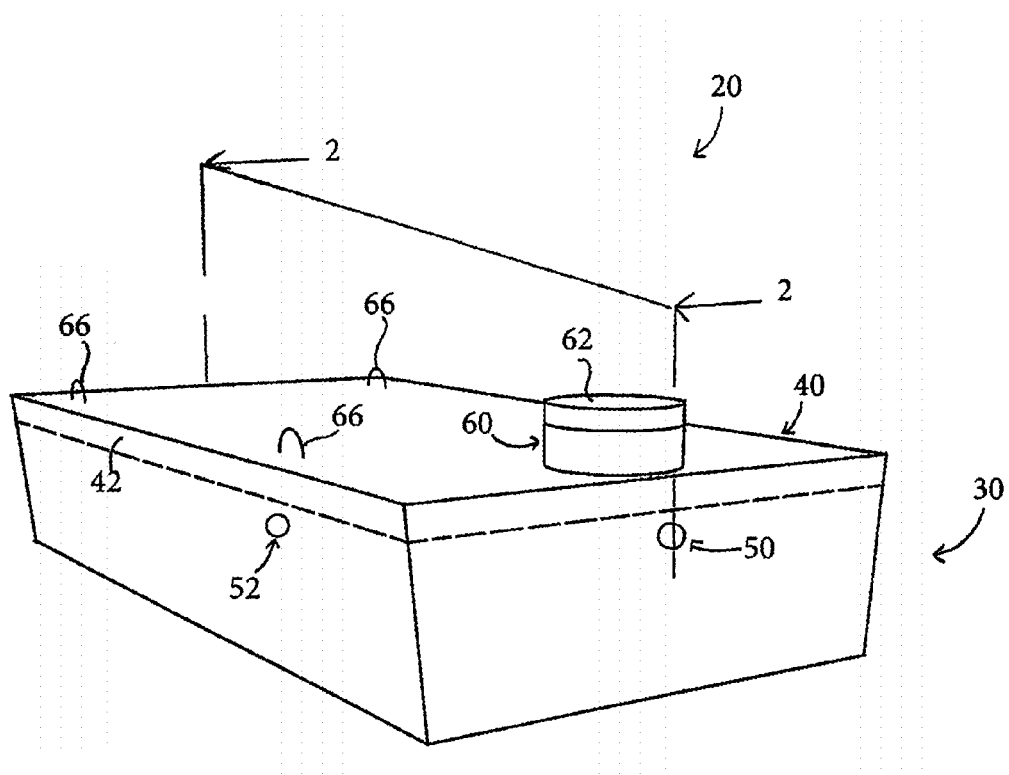
FIG. 1 is a perspective view of a tank in accordance with one aspect of the present invention.
Figure 7:
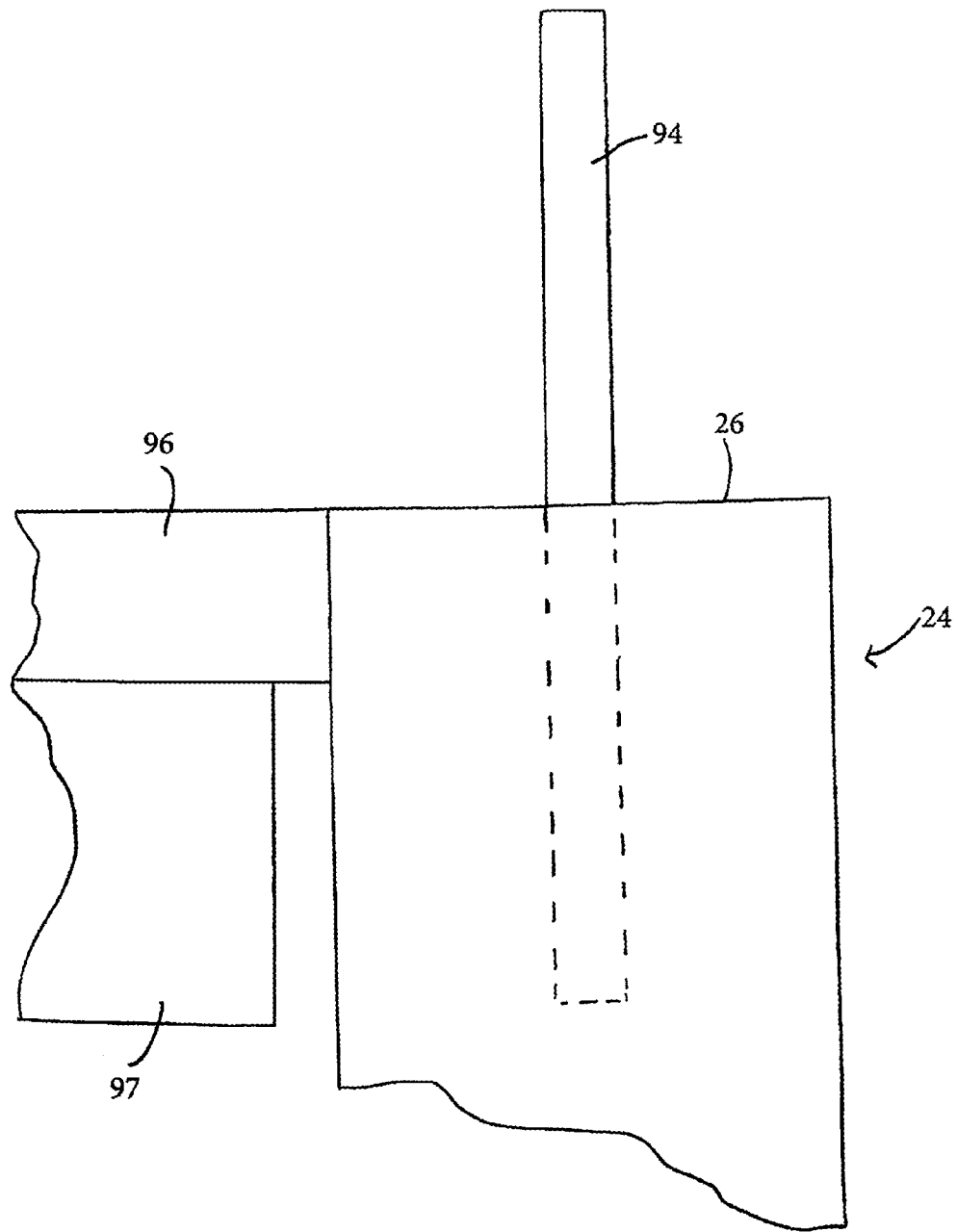
FIG. 7 is a partial side view of a component in accordance with an aspect of the present invention.

While the invention is amenable to various modifications and alternative forms, specifics thereof have been shown by way of example in the drawings and will be described in detail. It should be understood, however, that the intention is not necessarily to limit the invention to the particular embodiments, aspects and features described. On the contrary, the intention is to cover all modifications, equivalents, and alternatives falling within the spirit and scope of the invention and as defined by the appended claims.

DETAILED DESCRIPTION OF THE INVENTION

Referring to FIGS. 1-21, aspects of the tank, system, and methods are shown. In one aspect, tank 20 includes a tub 30 and a cover 40. Tub 30 includes a bottom 22 and four side walls 24 connected to bottom 22. In one aspect the four side walls 24 are integrally connected to the bottom 22. The walls 24 may be poured or formed in place at the same time as pouring or forming bottom 22. Tub 30 is formed of poured concrete. The structure may be pre-stressed if desired. Side walls 24 extend upward from bottom 22 as shown in FIG. 2 and FIG. 3. Material and liquid may be placed into and retained in tub 30 without leaking. A side wall 24 defines a perimeter top face 26. It may be appreciated that top face 26 extends around a perimeter of tub 30 along the four walls 24 (See FIG. 4). Cover 40 covers tub 30 by overlaying the perimeter top face 26. Cover 40 and tub 30 together define a bounded space inside tank 20 for holding materials, including liquids and including sewage, among other materials.

In one aspect a wall 24 defines an inlet 50. Inlet 50 allows material such as sewage to enter tank 20. A tank 20 will enjoy a storage capacity within the bounded space. The storage capacity depends on the size of the tub and also the positioning of the inlet 50. An upper level of the storage capacity of tank 20 is limited by a bottom of the inlet port 50 (i.e., the tank 20 will experience a full capacity when the sewage or other material raises to the water level "WL" defined by the bottom on inlet port 50). Material entering or attempting to enter into tank 20 when the level is at capacity will tend to cause back-up of such material. Tank 20 also includes a manhole riser 60 extending upward from cover 40. Manhole riser 60 includes a lid 62 which can be removed to gain access to the interior of tank 20. A vent port 64 is also included at cover 40. A vent pipe 63 may be inserted into or vent port 64 or otherwise extend upward from cover 40. A vent cap 65 may be placed over vent pipe 63. A rebar lift loop 66 or loops 66 are positioned within walls 24 and extend through cover 40 and upward to form a loop 66 as shown. Loops 66 may be encased in place within walls 24 with upper portions of the loops 66 extending above cover 40. Loops 66 may be used to lift tank 20, for example, by a crane or loader, by lifting respective loops 66. In one aspect walls 24 taper outward from bottom 22 to top of tank 20. As described below, such taper facilitates removal from a mold used to form tank 20.

In one aspect at least one brace 70 is included within tank 20. A brace 70 may include a concrete column 70 or other brace or structure. In one aspect a column 70 is a concrete column and extends from bottom 22 to cover 40. Particularly, column 70 extends from a top surface of bottom 22 to a bottom, bottom area, or bottom surface of cover 40. In one aspect column 70 forms a part of cover 40 as column 70 and cover 40 are created with the same pour of cement. In other aspects that the column may be formed other than by or with the same pour. Column 70 provides structural support for cover 40. Multiple columns 70 may be utilized in tank 20. In providing support for cover 40, columns 70 allow for a variety of manufacturing and improved configurations for tank 20. Particularly, use of columns 70 allow for cover 40 to span relatively great distances between walls 24. Providing a greater span of cover 40 results in configuring tank 40 with a relatively low profile while continuing to provide a desired volume capacity. Use of a column 70 provides structural support to cover 40 so that the length and width of tank 20 can be increased while decreasing the height or depth of tank 20 while maintaining a desired volume capacity. For instance, a tank 20 having inside dimensions of 199 inches in length by 95.5 inches in width by 24 inches of thickness or liquid depth will result in a 2000 gallon capacity tank 20. Heretofore, such 2000 capacity tanks have had heights or depths of much greater than 24 inches. Typically such prior tanks were configured with relatively large or great liquid depths (and relatively narrowly spaced walls). Preparing a location or site for positioning such prior tanks having high profiles has been difficult. For instance, the high-profile tank typically requires a deeper hole or preparation for placement, resulting in additional expense and limitations on where a tank may be placed. Because a deeper position is generally required for a high-profile tank, a problem may present when digging in wet land areas. It is best to avoid placement of a tank in a wet region to guard against leaking/seepage, and also because a wet area may cause a tank to float or pop from beneath the soil designed to cover the tank. Use of internal columns 70 allows for manufacture of relatively low-profile tanks 20 as may be appreciated and further discussed herein.

With reference to FIG. 2, tank 20 includes walls 24 such that a liquid depth may be 24 inches (while still maintaining a 2000 gallon capacity). For instance, the distance from bottom 22 to the liquid level or Water Level "WL" (i.e., the bottom of inlet 50) measures 24 inches where the inlet 50 is positioned generally as shown. In this aspect there is a 6 inch gap between the liquid level and the bottom surface of cover 40. It may be appreciated that as cover 40 gets longer and/or wider, the volume of storage capacity of tank 20 may increase (while also maintaining the height constant). It may also be appreciated that the height may be lowered in some instances while still providing a desired storage capacity (provided the length and/or width of cover 40 is increased). Brace or column or multiple columns 70 allow for cover 40 to be increased in size so that low profile tanks 20 may be manufactured (and able to withstand the greater sizes of cover 40). Heretofore unworkable has been a precast single concrete tank having a storage capacity of at least 2000 gallons where the inlet port 50 is located no greater than 33 inches measured from the bottom of the tank. The present invention allows for such precast single concrete tanks 20. The present invention also accommodates for a capacity of at least 2000 gallons where the inlet port 50 is located no greater than 32 inches from the bottom 22. In other aspects the tank 20 may have a storage capacity of at least 2000 gallons where the inlet port 50 is located no greater than between 28 to 32 inches from the bottom. Applicant has developed a precast single concrete tank with storage capacity of at least 2000 gallons while having a length of 17 feet and a width of 8½ feet (102 inches; which complies with or is less than many if not most wide-load trucking regulations) while maintaining an inlet port location measured 28 inches from the bottom of the tank. Moreover, the invention may be utilized with a variety of sizes of tanks having various capacities where the inlet port enjoys a relatively low orientation. For instance, a 2500 gallon capacity tank may be formed using the features of the present invention where the tank has a length of 17 feet, a width of 8½ feet and an inlet port located no greater than 37 inches from the bottom of the tank. The inlet port may also be located at 35 inches or even lower while still enjoying 2500 gallon capacity. In the case of the 2000 gallon or 2500 gallon tanks shown in FIG. 4 and FIG. 6, the tank 20 will weight approximately 20,000 pounds (empty). The features of the present invention may also be utilized for tanks having storage capacities of less than 2000 gallons and more than 2500 gallons (where the inlet port also enjoys a relatively low profile positioning). The complete precast concrete tank 20 is portable. Tank 20 may be placed onto a truck and transported to a site for use with a sewage system or for other purposes.

FIG. 3 depicts column 70 positioned generally at a middle position between walls 24. It may be appreciated that column 70 may be positioned at locations other than the middle, or that multiple columns 70 may be used for structural support of cover 40. With reference to FIG. 4, columns 70 are shown positioned on both sides of a wall 74 positioned in the storage space defined by tub 30. Wall 74 is a structural support for the cover 40 and also separates the storage space 21 into two storage portions 21a, 21b (See FIG. 4). As shown in FIG. 2, wall 74 extends from bottom 22 to cover 40. In one aspect, wall 74 defines a conduit 75. Conduit 75 is in communication with each of the two portions 21a, 21b and/or allows storage portions 21a and 21b to communicate. Conduit 75 is sufficiently large to allow material to pass from portion 21a to portion 21b. In one aspect, conduit 75 is also large enough to allow a person to crawl through wall 74 as described below. It may be appreciated that more than one wall 74 may be positioned within tank 20. Multiple walls 74 each having a conduit 75 may be used to create tank 20. In one aspect wall 74 may span between opposite walls 24, and in other aspects wall 74 may span a portion of the distance between opposite walls 24. In one aspect as shown in FIG. 4, two walls 74 define conduit 75. FIG. 4 also shows one instance where walls 24 may taper (i.e., walls 24 may lean outward where at a top portion they span a greater distance as compared to at a lower portion). Inner surface 24' of wall 24 shown in FIG. 4 represents an inner surface positioning of wall 24 at a bottom position (i.e., at or adjacent bottom 22), while inner surface 24" of wall 24 shown in FIG. 4 represents an inner surface positioning of wall 24 at an upper position (i.e., at or adjacent cover 40). In one example, walls 24 may span a distance of 102 inches wide by 17 feet (length) at a top portion while spanning a distance of 96 inches wide by 16½ feet (length) at a bottom portion. In one aspect walls 24 may have a thickness of 3 inches, bottom 22a thickness of 4 inches and cover 40a thickness of 6 inches. Other dimensions and thicknesses may be used.

As shown in FIG. 5, cover 40 may include a vent 65 positioned at vent port 64 to release gas and/or equalize pressure or allow for emergency back-up relief as may be appreciated. Cover 40 also includes manhole riser 60 and associated manhole and manhole cover as is common. Cover 40 is made of poured concrete or steel. In one aspect, cover 40 includes steel reinforcement, rebar, positioned throughout the cover 40 (See FIG. 16).

FIG. 6 shows an alternative aspect of tank 20' which includes walls 24 such that a liquid depth may be 30 inches (with a corresponding capacity of 2500 gallons in one aspect). For instance, the distance from bottom 22 to the underside of cover 40, measures 30 inches where the inlet 50 is positioned generally as shown. In this aspect the liquid level in the manhole riser 60 may be higher than the underside of cover 40. Use of such configuration allows for greater storage capacity due to the increased effective use of storage space 21. The additional six inches of upper level capacity allows for an increase in the overall capacity of tank 20. It may be appreciated that tank 20' shown in FIG. 6 is basically the same as tank 20 shown in FIG. 2 except for the positioning of inlet 50. The tank 20 shown in FIG. 6 has a 2500 gallon storage capacity, yet enjoys a relatively low inlet port 50 location. In one aspect inlet port 50 may be positioned at 33 inches from the bottom 22 while providing 2500 gallon storage capacity. In other aspects utilizing the features of the present invention, different dimensions of tank 20 may be established (i.e., varying the length and/or width and/or use of a riser) for a tank capacity of at least 2500 where the inlet port 50 is positioned no greater than 37 inches. In other aspects the features of the present invention may be used for tanks ranging from 2000 to several thousand, even tens (or hundreds) of thousands of gallons, all while maintaining a relatively low inlet port 50. The low orientation of port 50 is made possible at least in part due to the use of columns 70 (and/or walls 74) so that a larger cover 40 may be used, which in turn allows tank 20 to enjoy high capacity with a low profile.

In a further aspect tank 20 includes an outlet port 52 or ports 52 which allow for interconnecting together multiple tanks, including additional tanks 20. Outlet port 52 may used to allow sewage or materials to flow out of tank 20. A plug may be used to close outlet port 52. An outlet port 52 may be positioned in each or at all of the four side walls 24. Port 52 may be located above the container material level line or Water Level WL, outlet port 52 may also be positioned below the Water Level if desired. With an outlet port 52, a designer may connect together multiple tanks to increase capacity as desired or required. Moreover, providing a port 52 at each of the side walls 24 allows the installer flexibility on where to position the subsequent tank or tanks. A plurality of tanks may be connected together in series by utilizing port 52. The flexibility afforded due to tank 20 and the ability to combine and orient additional tanks allows the installer to adjust the placement for a desired arrangement to comply with or avoid set-back requirements (i.e., configure tank 20 and an additional connected tank or tanks to comply with a lot line or well setback or other regulations).

In a further aspect with reference to FIG. 2, FIG. 6, FIG. 7, and FIG. 8, a seal 94 is positioned in tank 20. The seal 94 is also shown in the other Figures. The seal 94 is shown in broken lines in FIG. 2 to represent that seal 94 is complete concealed (concealed within walls 24 and cover 40). Seal 94 is positioned at a perimeter top face 26 of wall 24. In one aspect seal 94 runs substantially the entirety, or the entirety, of the perimeter of top face 26 (i.e., along the top of all four walls 24 of tub 30). In one aspect, seal 94 is continuous. Seal 94 extends from within the wall 26 or walls 26 and into cover 40. In one aspect, seal 94 is an encased-in-place seal 94. For instance, concrete is poured into place which encases seal 94. Such encasement provides a complete sealing or water stop at the joint between tub 30 and cover 40 as may be appreciated.

Heretofore, attempts to seal a cover onto a tank tub have included use of a tar strip or other sealant placed along the perimeter edge of a tub before setting a cover on top of the tub. Such efforts present many problems which negatively impact the performance and useful life of a tank. For instance, such tar strip seal may tend to split or crack or separate or otherwise fail, especially in climates where there is a freeze/thaw cycle. The tar strip might not be applied evenly or appropriately, the sealant may deteriorate, or the surfaces (i.e., top of the wall) may be jagged or chipped or cracked (or other problems with the typical sealant may be present). A jagged or chipped or cracked wall makes it difficult to assure a tight seal or a seal that is not easily broken. Because tanks are buried in the ground, the freezing and thawing causes movement of the tank and/or pressures or forces on the cover. The joint will develop cracks which allows liquid to enter the tank or escape the tank. The present seal 94, however, provides a reliable water stop at the tub-cover joint which heretofore has been unavailable. Use of such a water stop (encased seal 94) essentially presents precast single concrete tank 20 as a monolithic tank structure created with two separate pours of concrete. In some jurisdictions such water stop may well be considered as presenting a monolithic variety of structure or sewage holding tank 20, despite the two separate pours which might otherwise be considered a "cold joint". Such monolithic structure or water stop has a benefit of protecting the environment from unwanted leaks.

Seal 94 is made of an elastomeric or flexible material, including rubber or foam or other appropriate sealing material. In one aspect, a roll of foam-like sealant is encased within walls 24 and cover 40. In one aspect, seal 94 has a width of six inches, where approximately three inches is encased within wall 24 (See FIG. 7) and approximately three inches extends upward from wall 24 and is encased within cover 40. In one aspect seal 94 has a thickness of one inch and a length of approximately 50 feet (to span the entirety of the perimeter of top face 26). Seal 94 may be continuous. It may be appreciated that different sizes or dimensions of seal 94 may be used to accommodate use in a particular case.

In a further aspect of the invention, seal 94 may be placed within a channel or groove situated about the perimeter top face 26 of tub 30. The channel or groove may be formed in place when tub 30 is poured or may be chiseled or cut or otherwise created after the concrete pour. The seal 94 may extend upward from the perimeter top face 26. In one aspect with respect to FIG. 20 and FIG. 21, channel or groove 28 is positioned at perimeter top face 26. Likewise, a channel or groove 29 may be defined by cover 40' at an underside. The channel or groove 29 within cover 40' may be formed in place when the cover 40' is poured or may be chiseled or cut or otherwise created after the concrete pour of a cover 40' (i.e., such as with a pour of a cover that is formed away from tub 30 and later placed upon tub 30). In one aspect, the invention includes insertion of a seal 94 into a groove 28 at the perimeter top face 26 of concrete tub 30 and then placing a concrete cover 40' upon the perimeter top face 26 such that the seal 94 also inserts into a groove 29 of the cover. The seal may friction fit within the respective channels or grooves. The seal may come in segments or may be a continuous loop. In other aspects, a double channel and double or two seals may be utilized at the perimeter top face 26 with a corresponding double channel positioned at the underside of the cover to receive two separate seals. It may be appreciated that multiple channels and multiple seals may also be used. The groove 29 or grooves of the cover may be formed to mirror the groove 28 or grooves of the perimeter top face of the tub. The cover may include reinforcement such as rebar as desired. The cover may also include a manhole riser and vents and lift loops as desired. Additional sealant such as tar or other sealant may also be used in conjunction with the placement of the cover upon the tub. In one aspect a channel or groove may be created by insertion of a Styrofoam or other placeholder piece (such as a strip of Styrofoam) within the wet cement at and along the perimeter top face 26. After the cement hardens, the placeholder piece may be removed (such as by cut-out or power wash, etc.) to leave behind a shaped channel or groove. The channel or groove may be tapered to better hold or secure or friction-fit an inserted seal 94.

In a further aspect the invention includes a method of making a concrete tank 20. The method includes a first pouring of concrete to form a concrete tub having a bottom 22 and four walls 24 extending upwardly from bottom 22. The walls 24 define a perimeter top face 26 of the tub. The method includes a second pouring of concrete onto a deck to form cover 40 which overlays the perimeter top face 26, the second pouring also forms at least one concrete column 70. The column 70 extends from cover 40 to the bottom 22 of tub 30 and provides support to hold cover 40. In a further aspect (or in an alternative aspect without the column 70) of the method, the second pouring partially encases seal 94 which extends upward from the perimeter top face 26 of tub 30. The second pouring completes a full encasement of seal 94 where the first pouring encases at least a portion of seal 94 (See FIG. 7).

Figure 8:
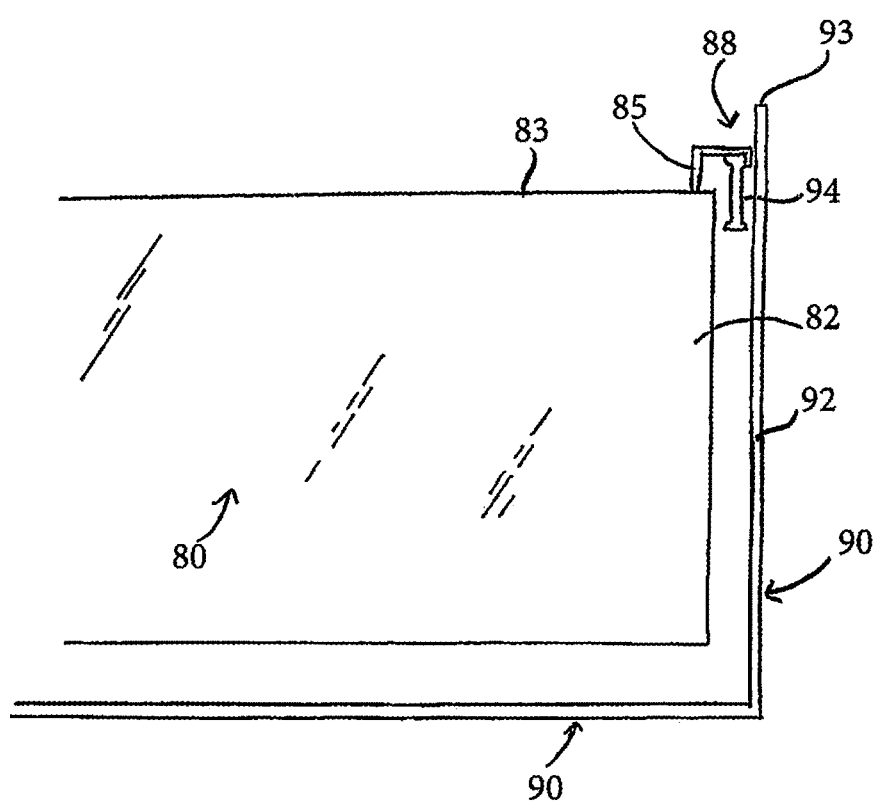
FIG. 8 is a partial section view of a component in accordance with an aspect of the present invention.
Figure 9:
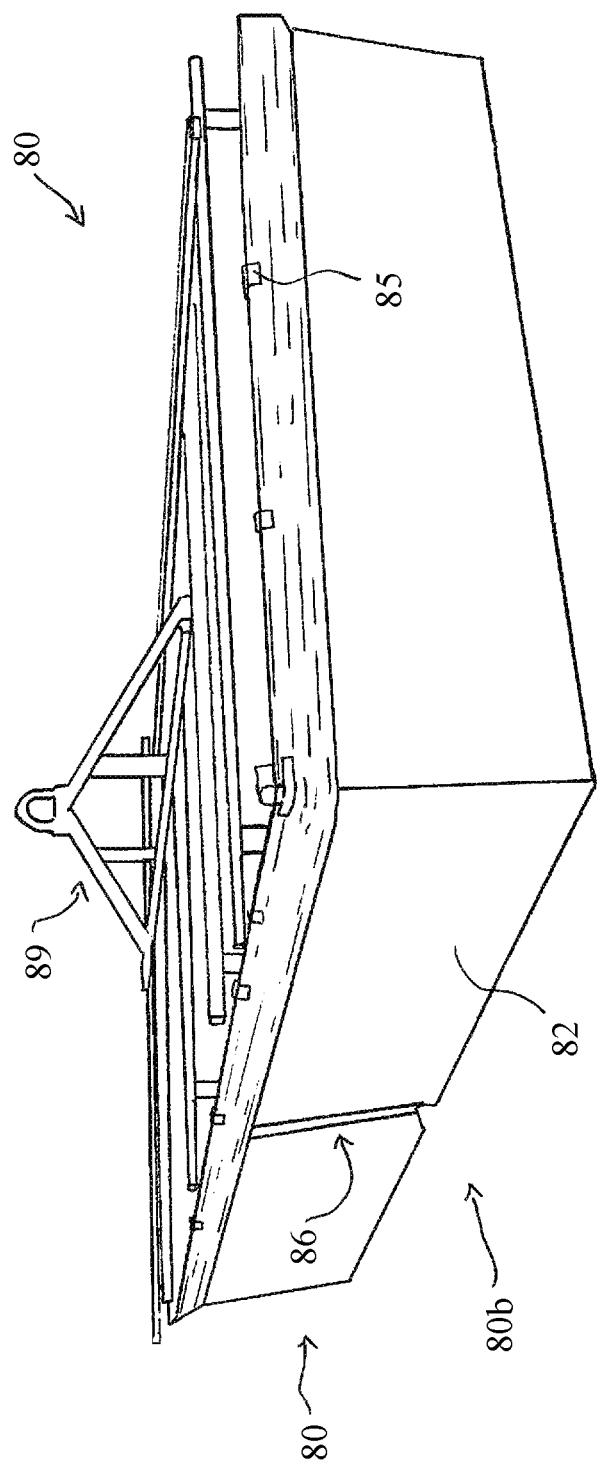
FIG. 9 is a perspective view of a form system in accordance with an aspect of the resent invention.
Figure 10:
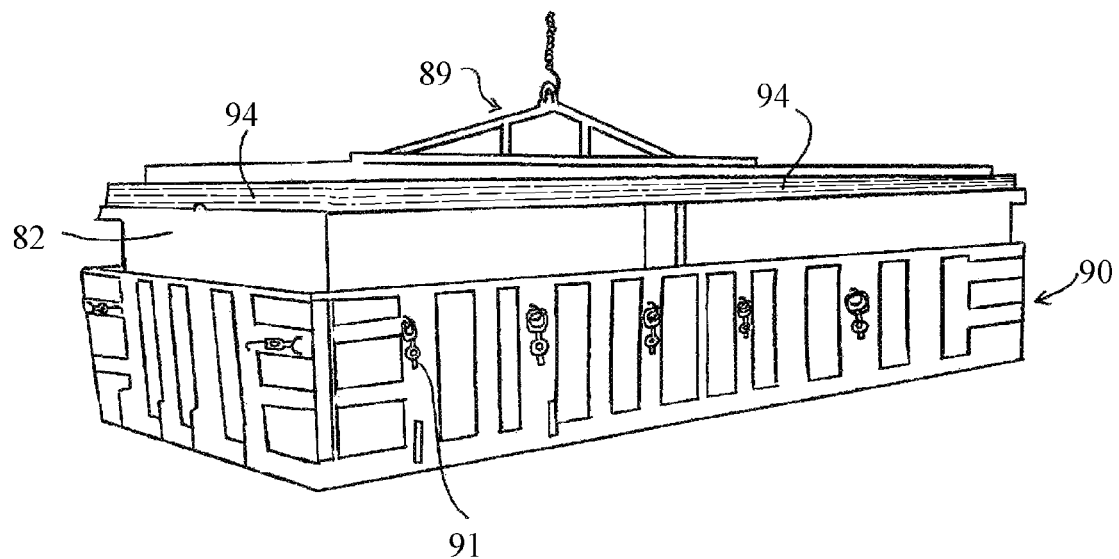
FIG. 10 is a partial perspective view of a form system used in accordance with the present invention.
Figure 11:
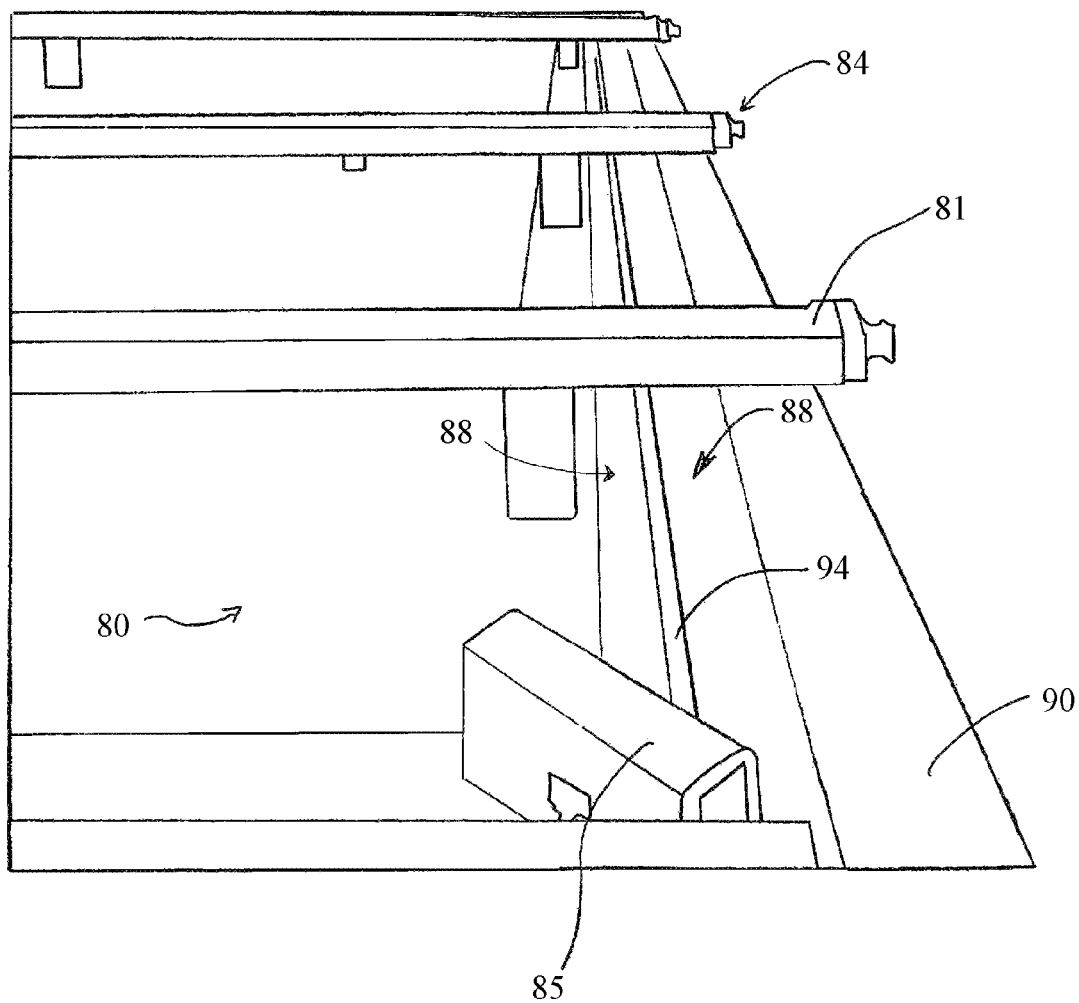
FIG. 11 is a partial perspective view of the form system of FIG. 9.
Figure 12:
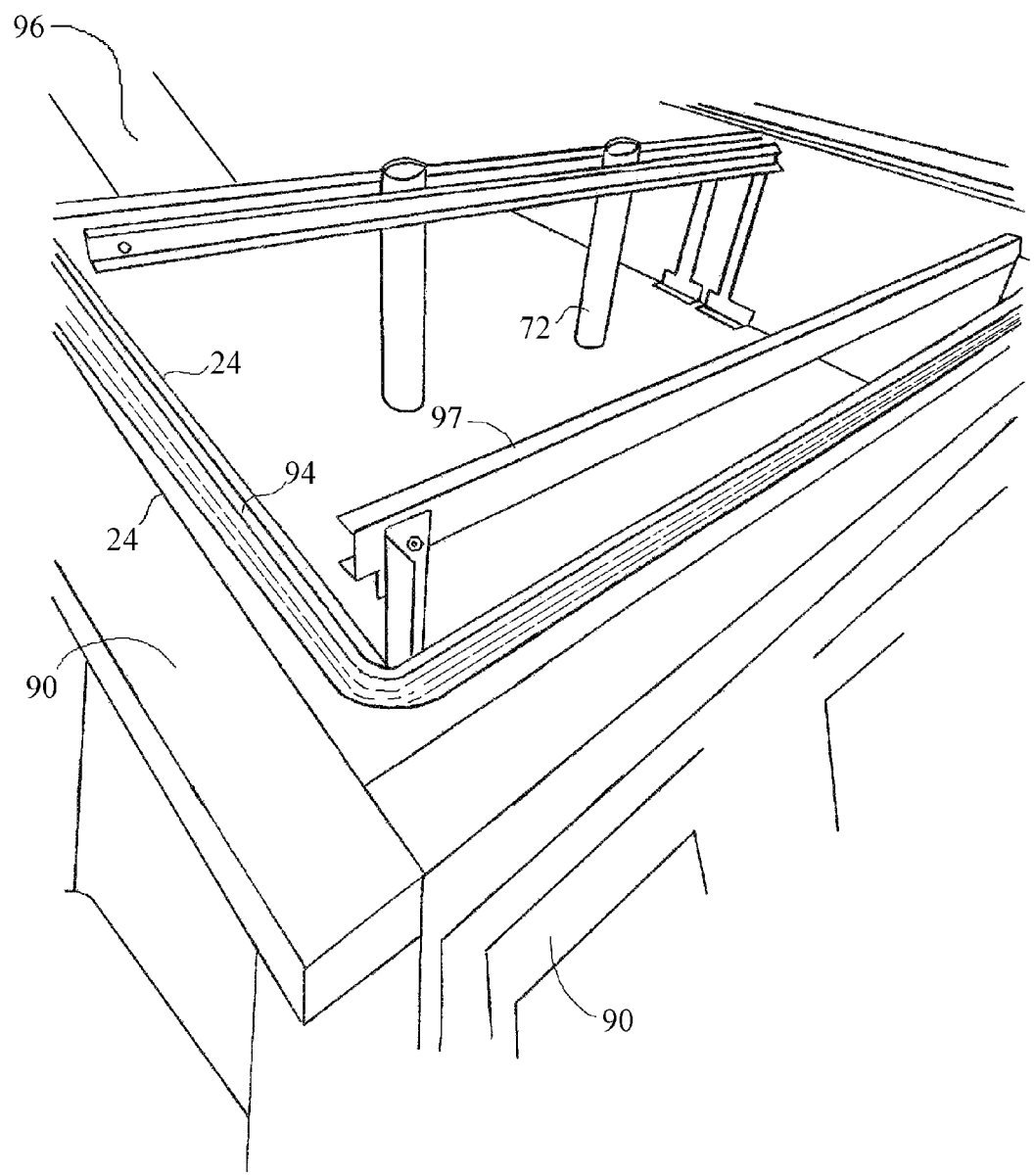
FIG. 12 is a partial perspective view of a component of the present invention within a form in accordance with the present invention.
Figure 13:
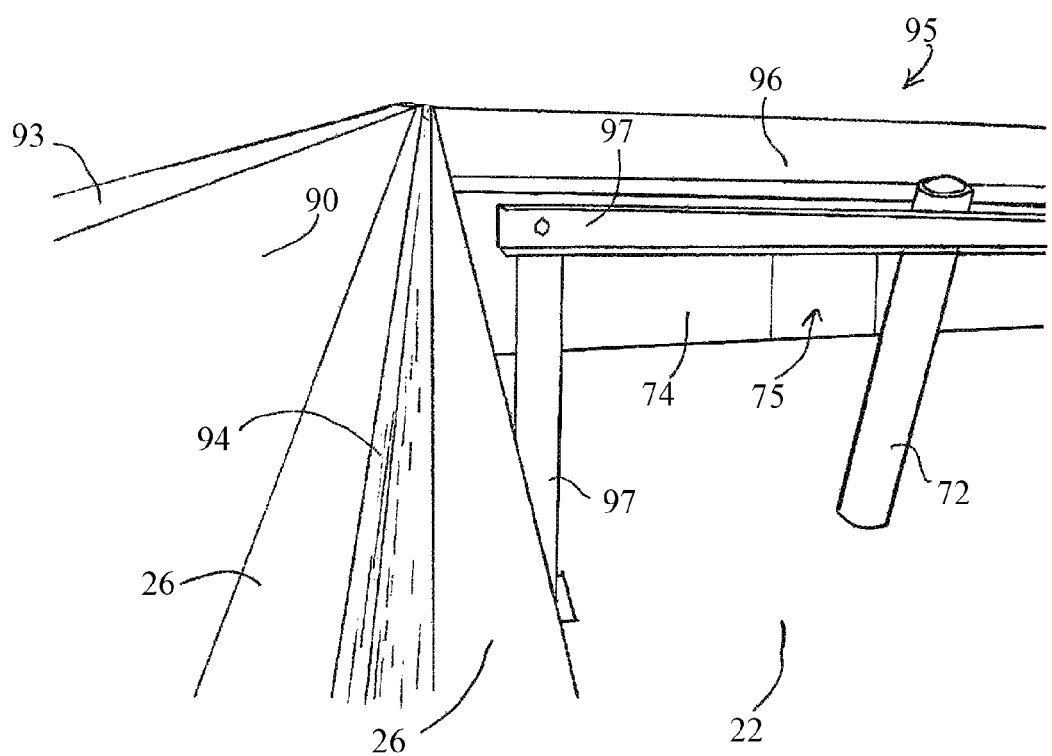
FIG. 13 is a partial perspective view of a component of the present invention within a form in accordance with an aspect of the present invention.
Figure 14:
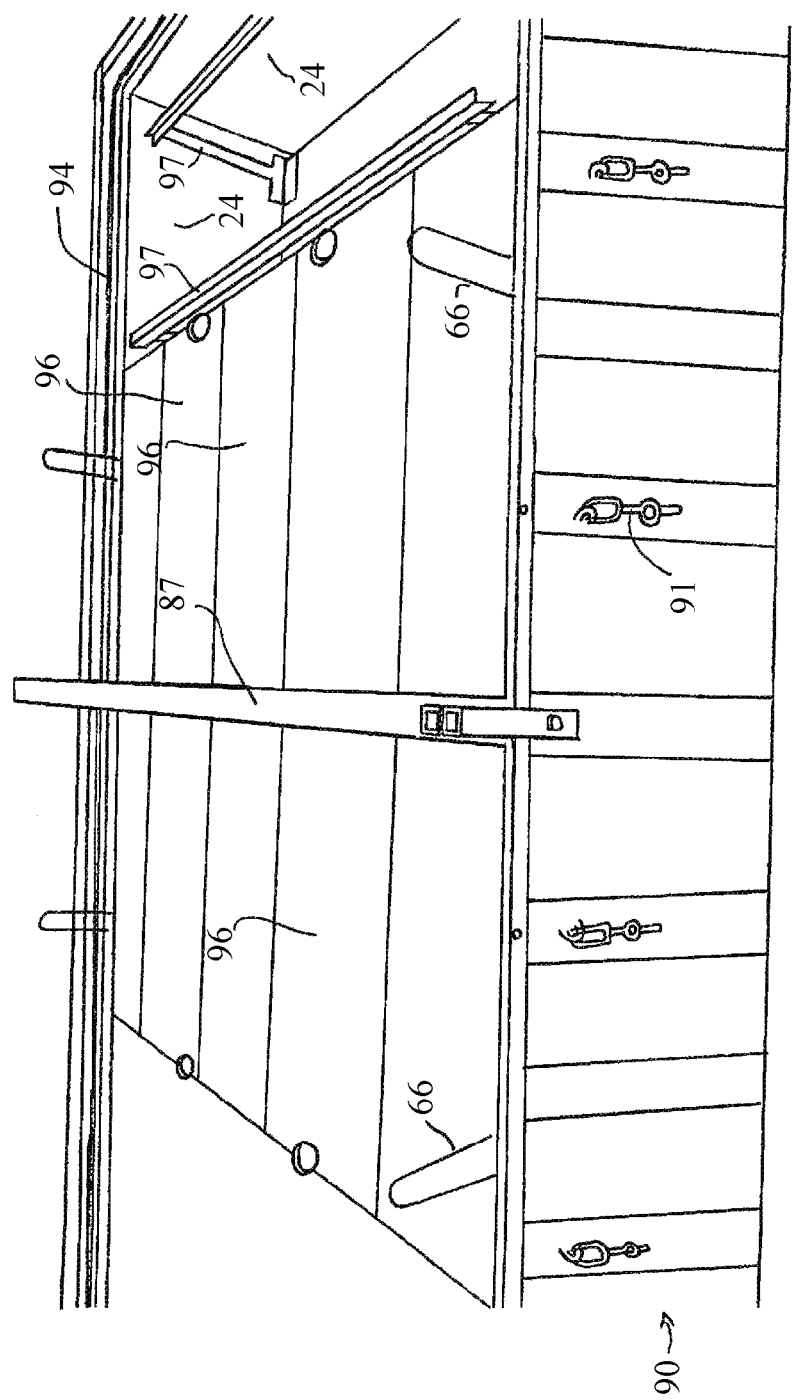
FIG. 14 is a partial perspective view of a component of the present invention within a form in accordance with an aspect of the present invention.

Further details of the method aspects are now addressed. Prior to the pouring steps, an inner form 80 (See FIG. 9) is aligned within outer form 90 (See FIG. 8 and FIG. 10). FIG. 10 depicts a loader being used to lower form 80 into form 90. It may be appreciated that form 80 includes a bottom and side walls which form a generally tub-like structure. When form 80 is positioned within form 90, an upper edge 83 of inner form wall 82 is positioned below an upper edge 83 of outer form wall 92. In a further aspect the invention includes a seal 94. Seal 94 is encased within cover 40 and within walls 24. As shown in FIG. 8, seal 94 is suspended between form 80 and form 90. In one aspect, seal 94 is connected to inner form 80 around an upper edge 83 of the inner form wall 82. With reference to FIG. 8 and FIG. 11 and FIG. 13, seal 94 is positioned between inner form 80 and outer form 90. In one aspect, seal 94 is suspended into or over gap 88 between form 80 and form 90 (See FIG. 8 and FIG. 11). A clamp 85 connects to form 80 and extends over the gap 88 to secure seal 94 into position. It may be appreciated that seal 94 may also be clamped to outer form 90 instead of or in addition to clamping to form 80. A lift loop 66 or lift loops 66 may be positioned within the gap 88 and suspended to be encased within the resulting walls 24 with a portion of loop 66 extending above form 90. Loop 66 may extend to the bottom 22 of tank 20 (See FIG. 1). Alternatives to loops 66 include providing knobs to the side wall 24 or establishing grooves or indents at the corners of adjacent wall 24 such that a line or cable may encircle tank 20 to be lifted upward. The tapered aspect of the walls 24 allow for a cable to tighten about tank 20 when making an upward lift motion of the cable. An inlet plug may also be positioned within the gap 80 to form inlet port 50 (outlet plugs may also be inserted to create outlet port or ports 52). The plug may be removed after pouring to leave behind the port 50.

Once the form 80 and seal 94 and plugs are placed within form 90, the first pour of concrete is ready to be made. Concrete is poured into gap 88 so that the concrete forms a tub 30 having bottom 22 and walls 24. The pouring of concrete within gap 88 also encases, at least partially, seal 94 within the concrete such that a portion of the seal 94 extends upward from the concrete (See FIG. 7, for instance). Seal 94 may extend around the perimeter of tub 30. Seal 94 may be continuous or in segments. Seal 94 may be continuous in having ends sealed or melted together and/or otherwise prepared without a seam for a continuous structure. Seal 94 may be made of suitable sealing material. Seal 94 may be flexible. In one aspect seal 94 is made of elastomeric material or materials. As shown in FIG. 11, seal 94 is oriented over gap 88 along the forms 80 and 90. When the concrete of the first pour has set, clamps 85 are loosened/disconnected from seal 94.

In one aspect form 80 includes spacer/suspension bars and binder ends (or may be used with spacer/suspension bars 81 and binder ends 84) so that form 80 can be securely positioned within form 90 (to prevent shifting of form 80 when cement is poured into gap 88). Spacer/suspension bars 81 allow form 80 to suspend within form 90. For instance, bars 81, which are connected to form 80, rest upon form 90 generally as shown in FIG. 11. Bars 81 span from end to end of form 90 so that form 80 is suspended within form 90. Spacer/suspension bars 81 also assist in appropriate spacing of form 80 away from form 90. For instance, a binder end 84 is configured to receive a chain binder 91 (See, for instance, FIG. 15) which connects to the outer side of form 90. The chain binder 91 is clamped so that bar 81 is strongly secured against form 90. For instance, binder 91 includes a loop that hooks over binder end 84. An operator may use the lever of binder 91 to force binder 91 into a downward position to clamp bar 81 firmly against form 90. Bars 81 have a length such that once a bar 81 is secured to form 90, the form 80 is properly spaced from form 90 to create an appropriate gap 88 around form 80. It may be appreciated that when cement is poured into gap 88, inner form 80 will tend to rise, thus spacer/suspension bars 81 and binder ends 84 are used to hold or clamp down form 80 and secure form 80 in suspended and proper position within form 90. Bars 81 are held or clamped onto form 90 so form 80 does not shift during the pour and subsequent setting of the concrete.

When the second pour is made the concrete fully encases seal 94. Particularly, the second pour encases that portion of seal 94 which remains exposed after encasing a portion of seal 94 during the first pour step. When the second pour is made the concrete may also form column 70 or columns 70.

In a further aspect, form 80 may comprise two form segments 80a, 80b (or multiple form segments). Segments 80a, 80b define a wall gap 86 (FIG. 9). Wall gap 86 fills with concrete during the first pour of concrete to form wall 74. In one aspect of the invention wall 74 spans from bottom 22 to cover 40. A plug is placed in wall gap 86 to form conduit 75 (See FIG. 4, FIG. 13, FIG. 17). The plug may be bolted to one of the segments 80a, 80b and then unbolted/removed when inner form 80 (or one of segments 80a, 80b) is removed from form 90. Particularly, inner form 80 is removed by disconnecting the plug from the segment 80a (or segment 80b) and then removing one of the segments 80a (or 80b). When one or both segments are removed the plug may also be removed, leaving a hole or conduit 75 in the remaining wall structure. Prior to removing both segments 80a, 80b, a spreader bar 87 is connected to form 90 by spanning from opposing walls. Spreader bar 87 prohibits the walls of form 90 from spreading apart due to the pressure caused by concrete of the poured tub 30. It may be appreciated that if spreader bar 87 was disconnected from form 90, the walls of form 90 would bow outward due to the force of pressure of tub 30. Once spreader bar 87 is installed, the segments 80a, 80b may be removed from form 90. In one aspect, the plug which is located between segments 80a, 80b is loosened (i.e., unbolted from one of the segments 80a, 80b). Thereafter one of the segments 80a or 80b is removed. The spreader bar 87 is then connected. Then the second of the segments 80a or 80b is removed. It may be appreciated that the plug which inserts within wall gap 86 and forms conduit 75 is connected (i.e., bolted) to only one of the segments 80a, 80b. The plug needs to be disconnected (unbolted) from the segment 80a, 80b in order for the segment to be lifted out from form 90.

Before removal of segments 80a, 80b, and suspension bars 81, spreader bar 87 is installed to prevent bowing of side walls of form 90. As shown in FIG. 9, seal 94 is clamped to form 80 (i.e., to each of segment 80a, 80b) prior to lowering form 80 into form 90. In one aspect both segment 80a and 80b are lowered together into form 90 so that seal 94 is retained into position. Alternatively, the segments 80a, 80b may be separately inserted into form 90, which would require seal 94 to be clamped once form 80 is suspended within form 90. FIG. 10 shows form 80, with segments 80a, 80b being simultaneously lowered into form 90. A pick bar 89 is connected to the spacer/suspension bars 81 to assist with simultaneously lowering segments 80a, 80b.

After form 80 is removed, a deck 95 is positioned in concrete tub 30. In one aspect tub 30 remains in form 90. Alternatively, tub 30 may be removed from form 90, in which case a separate mold or form would need to be utilized with tub 30 in order to pour the cover. Deck 95 and various components of the invention are shown in FIG. 12, FIG. 13, FIG. 14 and FIG. 15. Each of these figures shows the tub 30 in various stages or views. In one aspect, deck 95 comprises a series or system of panels 96 which are supported by a frame structure having frame elements 97. In one aspect the deck 95 comprises a supported panel system having panels 96 and a frame or frame elements 97. Frame elements 97, or some of them, rest on the inside of tub 30 at bottom 22. Frame elements may be made of suitable framing material, including but not limited to steel. A series of frame elements 97 support the deck panels 96 to complete deck 95. In one aspect panels 96 of deck 95 align with top face 26 (See FIG. 7) so that a second pouring of cement will form cover 40 while also completing full encasement of seal 94. The second pouring of cement creates cover 40 which is a poured-in-place cover.

In further aspects, deck 95 includes holes or column holes 98. A tube 72 is positioned within (or aligned with) a column hole 98. Tube 72 rests on bottom 22 and may extend to panel 96 or even extend through hole 98 or to a level of the top surface of panel 96. In one aspect a hole 98 is defined by at least two panels 96. In further aspects, a panel or panels 96 may be removed or released from frame elements 97 and the resulting concrete from the second pour as noted below. Defining a hole 98 with at least two panels 96 allows for the release of the panels (otherwise, if the tube 72 were positioned in a hole 98 formed by a single panel 96, the single panel 96 would not be removable from tank 20). In one aspect, each of the elements of deck 95 (including panels 96 and frame elements 97) may be disconnected and removed from tank 20 as further noted below. Tube 72 may remain within tank 20.

Figure 15:
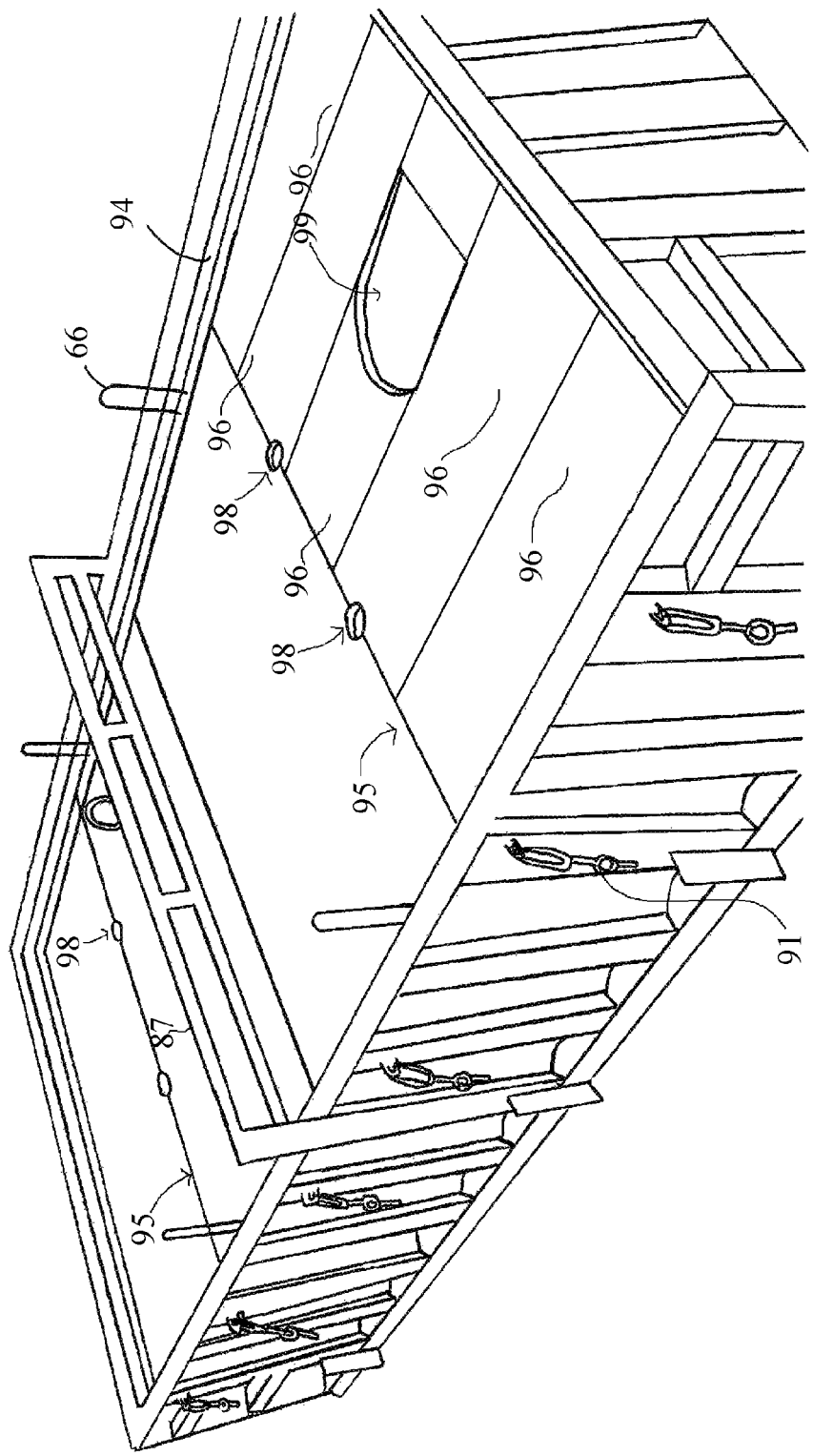
FIG. 15 is a partial perspective view of a component of the present invention within a form in accordance with an aspect of the present invention.
Figure 16:
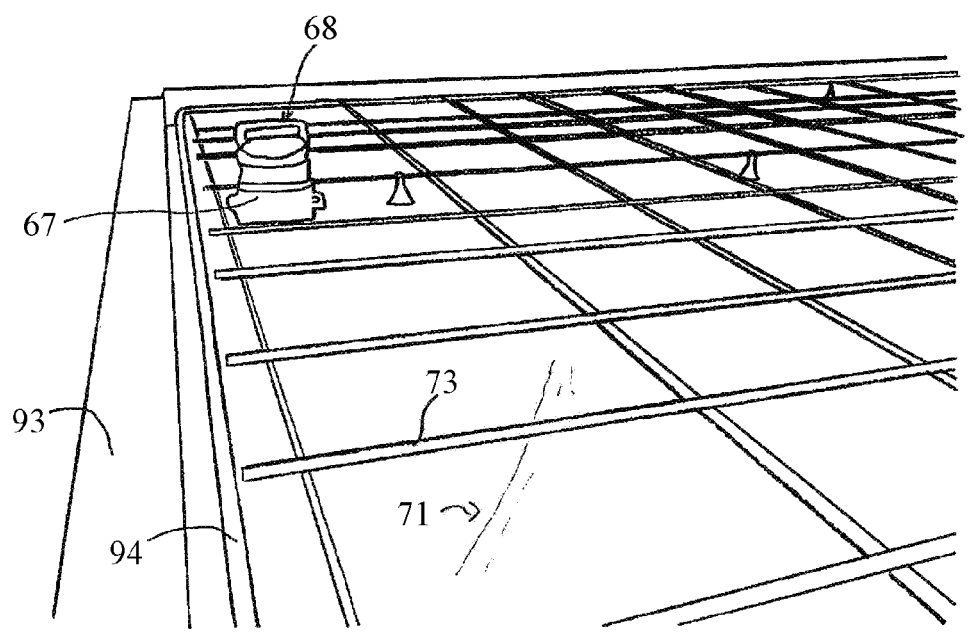
FIG. 16 is a partial perspective view of a component of the present invention within a form in accordance with an aspect of the present invention.
Figure 17:
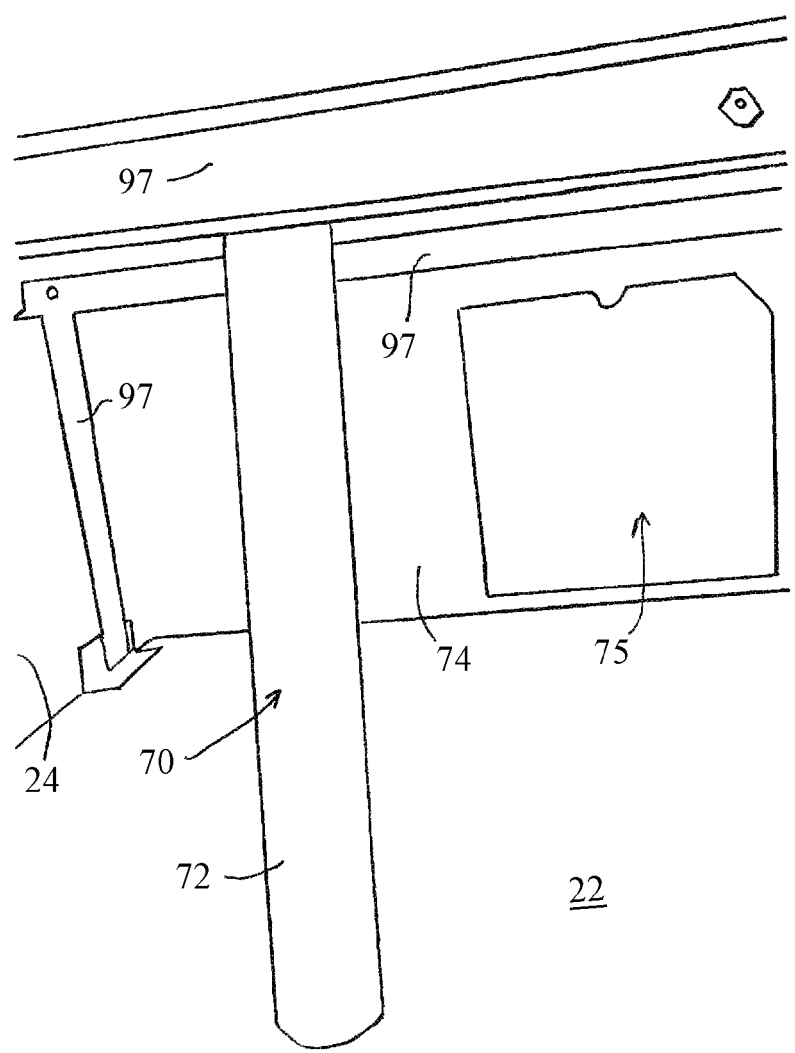
FIG. 17 is a partial perspective view of a component of the present invention within a form in accordance with an aspect of the present invention.
Figure 21:
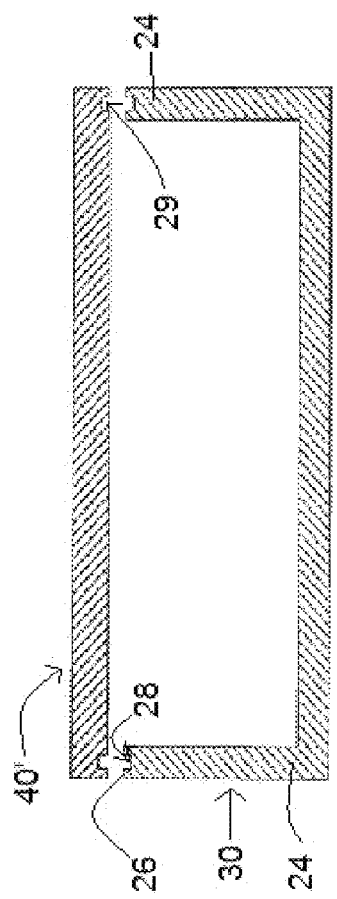
FIG. 21 is an exploded partial section view of a tank in accordance with a further aspect of the present invention.
Figure 20:
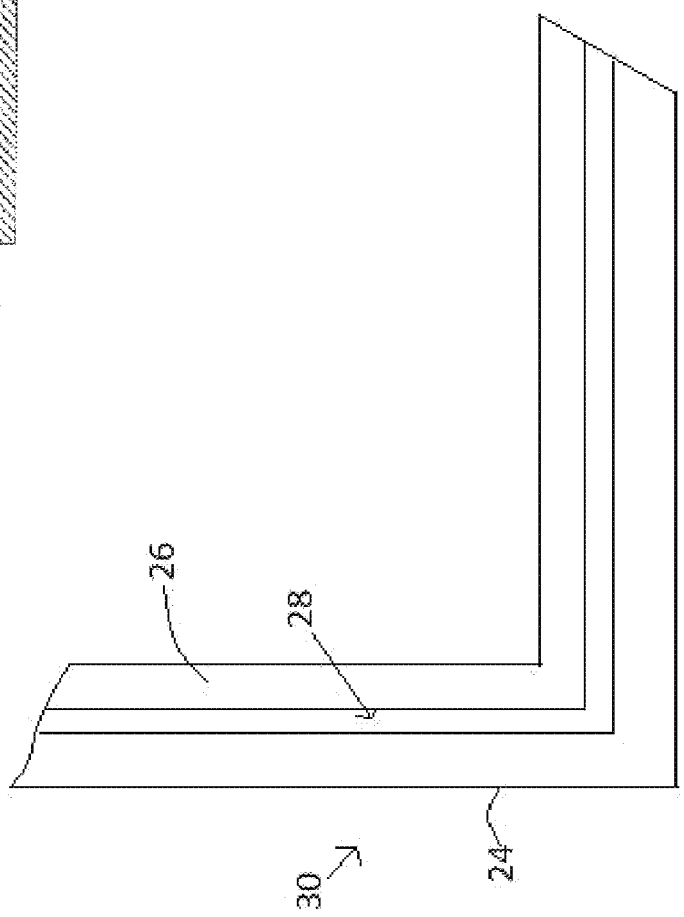
FIG. 20 is a partial top view of a component of the present invention in accordance with a further aspect of the present invention.

In one aspect deck 95 includes man opening 99 (See FIG. 15). Man opening 99 is an opening in deck 95 and is configured to allow the remaining elements of deck 95 to be passed therethrough. A manhole riser 60 is positioned on deck 95 and over man opening 99. In preparation for the second pour, a release sheet 71 (see FIG. 16) may be placed on deck 95 for easier release of concrete from deck panels 96. A reinforcement lattice of rebar 73 or other reinforcement materials may be positioned above release sheet 73 and above deck 95. In one aspect rebar 73 may be tied and suspended above release sheet 73 and deck 95 so that the rebar 73 is encased within cover 40. For instance, a cover may have a thickness of six inches so that rebar 73 may be fully encased in cover 40. A vent port 64 is formed in cover 40 by placing a gasket 67 on deck 95 (See FIG. 16). A mandrel 68 may be inserted into gasket 67 to assure gasket 67 remain circular when the cement is poured. A vent pipe 63 and associated cap 65 (See FIG. 2) may be inserted into vent port 64. Vent pipe 63 may extend any desired length.

In one aspect, when the deck 95 is completed (and when manhole riser 60 is in position, together with the rebar 73 and vent 65) the second pour of concrete is made. The concrete is delivered to deck 95 and flows downward into tubes 72 and around manhole riser 60 and vent gasket 67. The poured-in-place concrete of cover 40 creates a naturally formed seal against the riser 60 and vent gasket 67. The concrete extends over top face 26 to complete the encasement of seal 94. The concrete abuts the inside wall of outer form 90 and sets or hardens to form cover edge 42 (See FIG. 1). The concrete of the second pour also surrounds a portion of the lift loops 66 which extend upward from the top surface of cover 40. It may be appreciated that outer form 90 is utilized in both the first pour and the second pour in one method aspect of the present invention. Configuring inner form 80 to set below upper edge 93 of outer form 90 allows for the second pouring step to be performed within outer form 90.

After the concrete of the second pour step is allowed to set (and/or harden), the deck 95 may be removed from tank 20. In one aspect a worker crawls through riser 60 and into tank 20. In one aspect, removing the deck 95 comprises disconnecting the individual frame elements, such as panels 96 and frame elements 97, and passing those pieces through manhole riser 60. The frame elements are connected in segments of a length which allows the elements 97 to fit through riser 60. Likewise, the panels 96 are configured of length, width and thickness so that they may fit through riser 60. It may be appreciated that if the panels 96 or segments 97 are too long or too wide or too thick, such items might not be able to fit through riser 60. The frame elements 97 may be bolted together for easy assembly and disassembly. The panels 96 release from sheet 71. A worker may crawl through riser 60 and associated manhole and also through conduit 75 to enter segment 21b to remove the elements 97 and panels 96 to pass the same through conduit 75 and riser 60. In this manner the deck 95 may be removed and reused for use in manufacture of another tank 20. It may be appreciated that tube 72 or tubes 72 may remain within the tank 20 as desired. In one aspect, tube 72 is made of a PVC tube and cut to length. Alternative materials may be used for tube 72 as desired. Column 70 may also be created to have different sizes or shapes as desired by using different forms.

After the deck is removed, the outer frame 90 may be opened or removed (or alternatively tank 20 may be lifted from form 90) for storage or delivery or subsequent processing as desired.

In a further aspect, deck 95 may comprise an inflatable system 195 comprising at least one inflatable container 110 such as shown in FIG. 18. Inflatable container 110 may be made of flexible material and configured to receive a supply of fluid (or gas) for inflation. The fluid may include air or other gas or water or other liquid. An incompressible liquid may be used in one aspect. A supply line (to supply the liquid or fluid) may connect with container 110 and runs through tub 30 and exits manhole riser 60. Manhole riser 60 may be suspended on an inflatable container 110 or a separate structure used for suspension, such as PVC or other rigid support. Because manhole riser 60 extends above the level of the poured concrete, the concrete does not enter riser 60. The supply line which provides a supply of gas or liquid to container 110 extends out from riser 60. An operator may connect a water or other liquid (or gas) supply to the supply line and inflate the container 110. Several containers 110 may be utilized to fill the tub 30. When all containers 110 are inflated, the second pour may commence. Tubes 72 may also be used between or among the several containers 110 to accommodate formation of columns 70. Multiple tubes 72 may be used. A variety of structures other than tubes may also be used for creating columns, such as the "plus" structure 72' shown in FIG. 19. Other structures having different shapes may be used in place of structure 72' or tube 72 so that a desired resulting support column 70 is formed when undertaking the second pouring step. After the concrete has set, the container 110, or the several containers 110, may be deflated. The lines connecting to the containers are used to withdraw the liquid so that container 110 collapses and may be pulled out of the tank 20 by pulling on the supply line. Alternatively, a separate pull line may be connected to an individual container 110 or connected to several containers 110. Multiple tubes 72 or structures 72' may be arranged in order to design containers 110 to sufficiently fill the tub 30 so that a desired tank holding area can be created (i.e., to restrict cement from falling into tub 30 except at tubes 72, structures 72' or at minor areas or gaps between respective containers 110 and walls 24). Container 110 may be filled with water to sufficiently expand to prevent cement from filling between respective containers 110, tubes 72, structures 72', and walls 24, 74. Some of the containers 110 may be withdrawn from tank 20 through conduit 75 and then through riser 60. The tubes 72, structures 72' may remain within tank 20. Sheet 71 and rebar 73 may also be suspended as described above. Removal of containers 110 leaves cover 40 in position. A worker may also enter through riser 60 and remove the individual containers 110 after the containers are deflated. Containers 110 may be re-used for making another tank 20. Containers 110 may alternatively be disposable.

In a further aspect deck 95 may include a fillable system 295. Fillable system 295 may include a fillable container 210 which is configured to be filled with fluid or gas such as air or water or other incompressible fluid. A container 210 may have a preconfigured shape which sets into position within tub 30. The container is filled with water for instance, to provide extra structural support to suspend the cement of the second pour which is designed to form cover 40. Containers 201 may have a tapered structure to allow for ease of removal after the second pour. Alternatively, containers 210 may remain inside tank 20. In a further alternative, containers 210 may be cut out or severed or otherwise dismantled for removal from tank 20. Tubes 72 and structures 72' may also be used between respective containers 210.

In a further aspect deck 95 may include a fill-remove system 395. System 395 includes a fill piece 310. Fill piece 310 may include a foam or Styrofoam material which sits in place and supports the cement of the second pour to form cover 40. Several pieces 310 may be assembled within tub 30 to create the deck 395. When the second pour step is concluded, the pieces 310 are removed. The pieces 310 by chopping or cutting or power washing or otherwise dismantling them for removal from tank 20. It may be appreciated that other fill material may also be used to create pieces 310. It may further be appreciated that a combination of the decking systems may also be used. Sheet 71 may be configured to prevent or inhibit cement from seeping to undesired areas. A multiplicity of tubes 72 may be arranged together with sheet 71, containers 110, 210, and/or fill pieces or fillers 310 to provide a deck 95 strong enough to support the wet cement of cover 40.

While tank 20 may be used as a sewage holding tank, it may be appreciated that tank 20 may be used for other purposes. Tank 20 may also be used in conjunction with a septic system where filters and baffles are used in conjunction with tank 20. Tank 20 may be used for holding or storage of other materials as desired and for use in various environments and industries.

A precast concrete tank having a poured-in-place cover allows for enhanced sealing while also accommodating creation of poured-in-place columns to allow for low-profile tank structures. Use of a deck allows for the pour-in-place of the cover (and encase-in-place of the seal). Configuring the deck to include a manhole, with deck segments configured to be removed through the manhole, allows for the deck structure to be removed and thus economically creating such precast concrete structures (and removing unwanted materials from the tank which might otherwise rot or make the tank not comply with building or zoning codes). The removed decking may be re-used. The ability to remove the deck segments through a resulting manhole riser makes the decking worthwhile/possible which makes a pour-in-place cover possible which in turn allows for complete encasement of a water stop/seal and low profile structure. The tank is completely a precast concrete tank configured for transport to a site for placement in the ground and use.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise specifically indicated. While the particular HOLDING TANKS, SYSTEMS AND METHODS herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims.

What is claimed is:

1. A precast concrete tank comprising:
   a concrete tub having a bottom and four side walls connected to and extending upward from said bottom, said four side walls defining a perimeter top face of said tub;
   a poured in place concrete cover covering said tub and overlaying said perimeter top face; and a seal embedded and extending from within at least one of said four walls at said perimeter top face to within said cover.

2. The tank of claim 1 where said seal is an encased-in-place seal.

3. The tank of claim 2 where a lower portion of said seal is surrounded by one of said walls of said tub and an upper portion of said seal is surrounded by said cover.

4. The tank of claim 1 where said side walls are integrally connected with said bottom and said cover is a poured in place cover.

5. The tank of claim 1 where said seal is continuous and is positioned entirely around said perimeter top face.

6. The tank of claim 1 where said seal is an elastic seal.

7. The tank of claim 1 where said perimeter top face defines a tub channel, said seal positioned within said tub channel.

8. The tank of claim 7 where said cover includes a cover channel, said seal positioned within said cover channel.

9. The tank of claim 1 where said bottom, four walls and said cover bound a storage space, said tank further comprising a brace extending from said bottom to said cover within said storage space.

10. A precast concrete tank comprising:
    a concrete tub having a bottom and four side walls connected to and extending upward from said bottom, said four side walls defining a perimeter top face of said tub;
    a poured in place concrete cover covering said tub and overlaying said perimeter top face, said bottom, four walls and said cover bound a storage space, said tank further comprising a brace extending from said bottom to said cover within said storage space, and where said brace comprises a concrete column, said column integrally connected to said cover.

11. The tank of claim 10 where said side walls are integrally connected with said bottom, said column is a poured in place column integrally connected to said cover, said tank further comprising a tube surrounding a circumference of said column.

12. The tank of claim 10 where said storage space has at least a 2000 gallon storage capacity, said tank defining an inlet port in communication with said storage space, said inlet port located no greater than 32 inches from said bottom.

13. A precast concrete tank comprising:
   a concrete tub having a bottom and four side walls connected to and extending upward from said bottom, said four side walls defining a perimeter top face of said tub;
   a concrete cover covering said tub and overlaying said perimeter top face; and
   a seal embedded and extending from within at least one of said four side walls at said perimeter top face to within said cover.

14. A method of making a concrete tank comprising: pouring of concrete over a perimeter top face of a concrete tub having a bottom and four walls extending upwardly from the bottom, the walls defining the perimeter top face of the tub and having a seal embedded within and extending upward from the top face, said pouring of concrete covering the seal.

15. The method of claim 14 further comprising first pouring of concrete into a space between an outer mold and an inner mold to form the tub and to at least partially encase the seal, said first pouring of concrete and said pouring of concrete over a perimeter top face completely encases the seal.

16. The method of claim 14 where said pouring of concrete comprises pouring of concrete onto a deck to form the tank cover, the deck positioned within the tub.

17. The method of claim 16 where the deck includes one from the group of: a removable panel system, an inflatable system, a fillable container system, a fill-remove system.

18. The method of claim 15 further comprising suspending the seal between the inner mold and the outer mold prior to said first pouring.

19. The method of claim 15 where an upper edge of the inner mold is positioned below an upper edge of the seal.

20. The method of claim 15 further comprising removing the inner mold.

21. The method of claim 16 further comprising removing at least a portion of the deck.

22. The tank of claim 13 where said seal is an encased-in-place seal, a portion of said seal is embedded within at least one of said walls and a portion of said seal is embedded within said cover.

23. The tank of claim 13 where said cover is a poured-in-place cover.

24. The tank of claim 13 where said perimeter top face defines a tub channel, said seal positioned within said tub channel, and said cover includes a cover channel, said seal positioned within said cover channel.

25. The tank of claim 1 where concrete from at least one of said walls is exposed to a storage space defined by said tub.

26. The method of claim 14 where a portion of the seal is surrounded by one of the walls of the tub.

* * * * *